United States Patent [19]

Mölders et al.

[11] 4,309,027

[45] Jan. 5, 1982

[54] PNEUMATIC SPRING HAVING SELECTIVELY RELEASABLE ROD-RETAINING STRUCTURE

[75] Inventors: Werner Mölders, Plaidt; Wolfgang Luhn, Nievern, both of Fed. Rep. of Germany

[73] Assignee: Stabilus GmbH, Koblenz-Neuendorf, Fed. Rep. of Germany

[21] Appl. No.: 97,793

[22] Filed: Nov. 27, 1979

[30] Foreign Application Priority Data

Nov. 28, 1978 [DE] Fed. Rep. of Germany ....... 2851366

[51] Int. Cl.³ .............................................. F16F 9/32
[52] U.S. Cl. .................. 267/124; 267/64.12; 92/18; 188/300
[58] Field of Search ............. 267/124, 120, 8 R, 95 R; 16/66, 49; 92/18, 19, 26; 188/282, 300; 217/60 R, 60 F; 403/104, 329, 379

[56] References Cited

U.S. PATENT DOCUMENTS

| | | | |
|---|---|---|---|
| 2,920,338 | 1/1960 | Falk | 16/66 |
| 3,789,742 | 2/1974 | Hershman et al. | 92/26 |
| 3,883,126 | 5/1975 | Nicholls | 267/65 R |
| 4,078,779 | 3/1978 | Molders | 267/120 |
| 4,166,612 | 9/1979 | Freitag et al. | 267/65 R |

FOREIGN PATENT DOCUMENTS

2353888 10/1973 Fed. Rep. of Germany .

*Primary Examiner*—James B. Marbert
*Attorney, Agent, or Firm*—Brumbaugh, Graves, Donohue & Raymond

[57] ABSTRACT

In the illustrative embodiments described, a pneumatic spring includes selectively releasable structure, located in part at the outer end of the piston rod and in part at the corresponding end of the cylinder, for retaining the piston rod at or near its innermost position within the cylinder. The retaining structure carried by the cylinder preferably constitutes a sleeve surrounding the piston rod, and the structure carried by the piston rod may include projections for coacting with shoulders on the sleeve. Alternatively, the sleeve and piston rod may be formed with cooperating recesses for receipt of an external pin-like securing bracket.

9 Claims, 6 Drawing Figures

PNEUMATIC SPRING HAVING SELECTIVELY RELEASABLE ROD-RETAINING STRUCTURE

BACKGROUND OF THE INVENTION

1. Field of the Invention

The present invention relates in general to pneumatic springs of the cylinder-and-piston rod type and, in particular, to such pneumatic springs which include structure for selectively releasably retaining the piston rod at or adjacent the fully retracted position.

2. The Prior Art

Pneumatic springs which include a provision for retaining the piston rod at or near the fully retracted position within the cylinder cavity are known in the prior art. For example, U.S. Pat. No. 4,166,612 discloses a pneumatic spring in which the piston rod is provided with an extension at its inner end to sealingly engage a matching chamber in the interior of the cylinder as the piston rod reaches or nears its innermost position and thereby retain the piston rod at or near such innermost position. In this prior art device, the cylinder cavity communicates with the chamber at a point below the piston through valve means which opens as the piston rod extension enters the chamber and which closes when the piston rod starts to leave the chamber. Closure of the valve means functions to retain the extension within the chamber and, consequently, the piston rod at the innermost position within the cylinder. This known retaining structure is particularly suited for use in vehicles as auxiliary lifting means for the rear lid or trunk lid of a car, the lifting force being eliminated in the region of the inner end position of the piston rod by virtue of the action of the retaining structure. Although such prior art devices are useful for these purposes, it is desirable in certain situations that the retaining structure be operable only at certain times, as, for example, when the spring is being mounted or dismounted, and that the piston rod otherwise be able to move freely and fully inward and outward of the cylinder without engagement by the retaining structure. The aforementioned prior art devices, however, are not capable of such selective operation of the retaining structure.

SUMMARY

It is, therefore, an object of the present invention to provide improved structure for retaining the piston rod of a pneumatic spring at or adjacent its innermost position within the cylinder, which retaining structure may be readily connected and disconnected to facilitate quick mounting and dismounting of the spring in the place of use.

The foregoing and other objects of the invention are attained by the provision of structure, carried in part by the end of the piston rod which projects from the cylinder and in part by the adjacent end of the cylinder, for releasably retaining the piston rod at or near its innermost position within the cylinder. The retaining structure is accessible externally of the cylinder for quick connection and disconnection. Particularly in circumstances in which the pneumatic spring cannot be mounted when the piston is in its outer position or in circumstances in which the spring cannot reach its outermost position after mounting, as, for example, when the pneumatic spring is mounted in a construction having a movable lid and abuts a stop before it has reached its outermost position, the retaining structure of the present invention represents a considerable help to the mechanic in the installation of the spring.

According to a further feature of the invention, the receiving structure is formed by at least one radial projection on the piston rod which engages a cooperating member connected to the cylinder. In a preferred embodiment, this cooperating member is a sleeve and has a recess for receiving the radial projection carried by the piston rod. If desired, the sleeve may be rotatably mounted on the cylinder and may be provided with an internal thread, in which case the cylinder is formed with a matching external thread. The radial projection on the piston rod may conveniently be adapted to be engaged with or disengaged from, as for example by selected rotation of the sleeve, a stop formed as a shoulder on the sleeve. Due to the thread connection between the cylinder and the sleeve, the length of the pneumatic spring can be varied within a small range to adjust its overall length as needed for installation purposes.

In a further advantageous embodiment of the invention, the retaining structure carried by the piston rod is in the form of a recess therein which is engaged by a removable member cooperating with the retaining member connected to the cylinder. In this case, the retaining member connected to the cylinder preferably also includes at least one recess which is likewise engaged by the removable member. The removable member may simply be a U-shaped pin, and the cooperating recesses in the piston rod and retaining member may be formed as annular grooves, thereby affording a simple yet effective retaining structure.

BRIEF DESCRIPTION OF THE DRAWINGS

Further objects and advantages of the invention will be apparent from the following description of exemplary embodiments thereof, taken in conjunction with the accompanying drawings in which.

DETAILED DESCRIPTION

Figure 1:
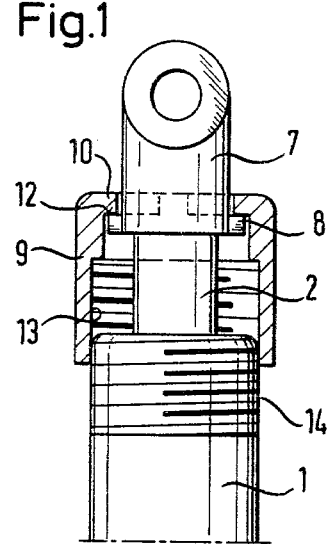
FIG. 1 is a longitudinal sectional view of one embodiment of the invention, wherein the piston rod retaining structure includes a projection on the piston rod and a sleeve that is threaded onto the cylinder.

The pneumatic springs including the retaining structures for the piston rod as described hereinafter and shown in the drawings are especially intended for use in applications where mounting of the springs in the rod-out or extended position is not possible or very difficult. This situation exists, for example, in the mounting of pneumatic springs in wardrobe beds or where the spring is to be mounted to lids or covers which are pressed against a stop so that the spring does not reach its outermost position during operation.

Figure 2:
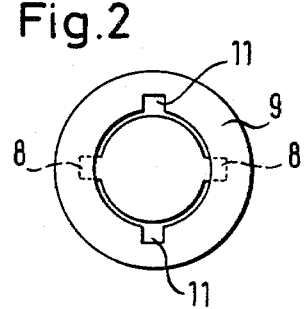
FIG. 2 is a top end view of the retaining structure of FIG. 1.

In the embodiment of FIGS. 1 and 2, the end of the container or cylinder 1 of the spring through which the piston rod 2 extends is formed with an external thread 14. The piston rod 2 carries at the outer end thereof a fastening eye 7, which includes a pair of diametrically opposed radial projections 8. A sleeve 9, having an internal thread 13, is threaded on the threaded outer end of the cylinder 1. At the upper end (as shown in FIG. 1) the sleeve 9 is provided with an inwardly projecting shoulder 10 which defines a stop 12 for the projections 8. To that end, the shoulder 10 is formed with opposed recesses 11 through which the projections 8 can be guided.

As the piston rod 2 is moved in the cylinder 1 and approaches the innermost, i.e., fully retracted, position therein, the sleeve 9 may be rotated to an angular position such that the projections 8 are received through the recesses 11. Subsequent rotation of the sleeve 9 with respect to the projections 8 then captures the projections below the stop 12 of the shoulder 10, as shown in FIG. 2, thereby retaining the piston 2 at or near the innermost position. As will be appreciated, the threaded connection between the sleeve 9 and the cylinder 1 enables the piston rod 2 to be retained at various axial positions within the range permitted by the threads. This facilitates the mounting of the pneumatic spring by enabling the mechanic to adjust its overall length as need requires to attach it to the mounting brackets.

After the gas spring has been mounted, the sleeve 9 is moved to such an angular position that the projections 8 can pass through the recesses 11 and thus release the piston rod. In a further step the sleeve 9 can be screwed down against the cylinder 1 so that the projections 8 do not contact the sleeve 9 when the piston rod is again moved back to the fully retracted position.

In the embodiment illustrated in FIGS. 3 and 4, the piston rod 2 guided in the cylinder 1 carries a piston 3 which divides a cavity in the cylinder so as to define a compartment 4 around the piston rod and compartment 5 below the piston 3. As is conventional, the cylinder cavity contains a gas under superatmospheric pressure. The piston rod 2 is guided in the cylinder 1 by means of the guiding and sealing unit 6 and the cavity is thereby sealed. The piston rod is formed in the region of the upper end thereof with an annular groove 15. The retaining member, in the form of a sleeve 16, is fixedly connected to the cylinder 1. This retaining member or sleeve 16 includes transverse recesses 17 for receiving the pin-like legs 18 of a securing bracket 19, as shown in FIG. 4. These legs 18 can engage the annular groove 15 in the piston rod 2 when the rod is so positioned axially that the annular groove 15 is in alignment with the recesses 17 transversely of the axis of the spring. The piston rod 2 will then be retained in the cylinder 1. After mounting of the spring, the securing bracket 19 is removed so that the piston rod is released. When the pneumatic spring is thereafter to be dismounted, the securing bracket is again inserted into the recesses 17 when the piston rod is in its inner position, so that the rod will again be held against the force of the pressurized gas tending to expel it.

Figure 3:
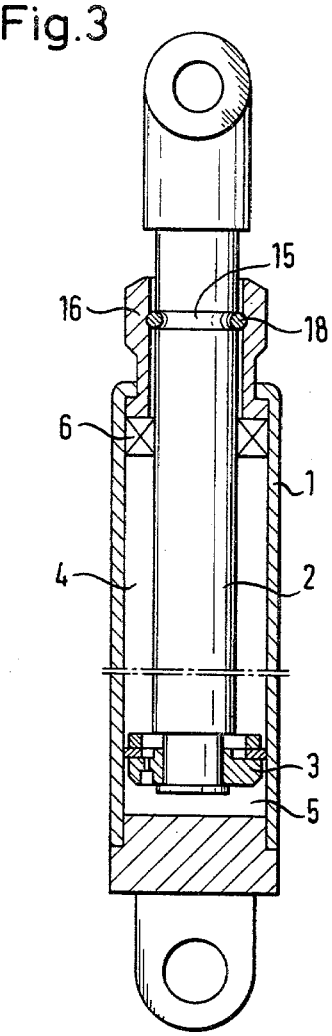
FIG. 3 is a longitudinal sectional view of another embodiment of the invention, wherein the retaining structure includes a pin received within matching grooves in the sleeve and the piston rod.
Figure 4:
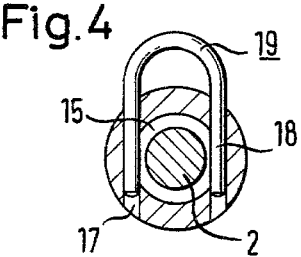
FIG. 4 is a cross-sectional view in the plane of the securing pin of the retaining structure of FIG. 3.
Figure 5:
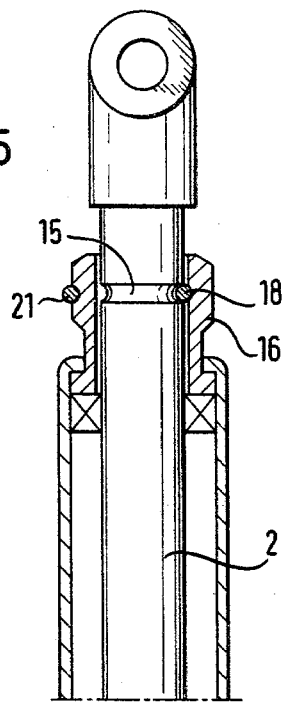
FIG. 5 is a longitudinal sectional view of a further embodiment of the invention, showing a modified securing pin.
Figure 6:
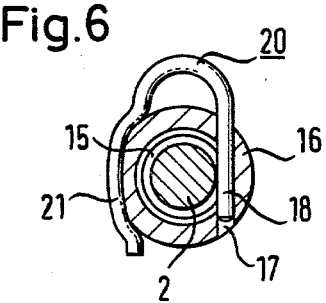
FIG. 6 is a cross-sectional view in the plane of the securing pin of FIG. 5.

The embodiment of FIGS. 5 and 6 is substantially the same as that of FIGS. 3 and 4, differing therefrom only in that the retaining member 16 includes only one recess 17 and that the securing bracket 20 engages the recess 17 by means of a single pin-shaped leg 18 which in turn also engages the annular groove 15 of the piston rod 2. The outer leg of the securing bracket 20 is in the form of a clamping leg and is shaped to clamp around the retaining member 16 over a portion of its periphery. In this manner, the securing bracket 20 is additionally secured against loss. In use, the securing bracket 20 is removed after the pneumatic spring has been mounted, thereby releasing the piston rod and permitting the gas spring to function in the usual way. The securing bracket 20 can be made of resilient material so that after the removal from the recess 17 it can be clamped onto the retaining member 16, e.g. at the neck portion thereof, to guard against loss of the securing bracket.

Although the invention has been illustrated and described herein by reference to specific embodiments thereof, it will be understood that these embodiments are illustrative only and that many variations and modifications thereof may be made without departing from the inventive concepts embodied therein. For example, the annular groove 15 in the piston rod 2 can be replaced by a transition between adjacent axial sections of the piston rod having different diameters. It is also possible to accomplish the same function by providing a radial opening through the piston rod. All such variations and modifications, therefore, are intended to be included within the spirit and scope of the appended claims.

We claim:

1. In a pneumatic spring including a cylinder defining a sealed cavity therein, a piston rod received through an axial end wall of said cylinder for axial movement relative to said cylinder between axially innermost and axially outermost positions, a piston carried by the piston rod within the cavity and dividing the cavity into two compartments, and a body of gas under pressure within said cavity tending to bias the piston rod axially outward of the cavity, the improvememt comprising: means carried in part by the piston rod externally of said cavity and in part by the cylinder at the end thereof through which the piston rod extends for selectively releasably retaining the piston rod at or adjacent said innermost position of the piston rod, said means comprising a sleeve mounted on said cylinder adjacent and extending beyond said end wall and surrounding said piston rod, said sleeve being provided with a substantially axially directed abutment face at the inner circumferential face of its section extending beyond said end wall, and further comprising an abutment member axially fixed with respect to said piston rod adjacent the axially outward end thereof, said abutment member being movable into and out of engagement with said abutment face in a plane substantially transverse to the axis of said piston rod.

2. The pneumatic spring of claim 1 wherein said retaining means comprises at least one radial projection carried by the piston rod and a retaining member, engaged by said projection, connected to said cylinder.

3. The pneumatic spring of claim 2 wherein the retaining member connected to said cylinder comprises a sleeve and includes at least one recess for receipt of said at least one projection.

4. The pneumatic spring of claim 1 wherein said retaining member is permanently secured to said cylinder.

5. In a pneumatic spring including a cylinder defining a sealed cavity therein, a piston rod received through an axial end wall of said cylinder for axial movement relative to said cylinder between axially innermost and axially outermost positions, a piston carried by the piston rod within the cavity and dividing the cavity into two compartments, and a body of gas under pressure within said cavity tending to bias the piston rod axially outward of the cavity, the improvement comprising: means carried in part by the piston rod externally of said cavity and in part by the cylinder at the end thereof through which the piston rod extends for selectively releasably retaining the piston rod at or adjacent said innermost position of the piston rod, said retaining means comprising at least one radial projection carried by the piston rod and a retaining member, engaged by said projection, connected to said cylinder, said retaining member being connected to said cylinder and comprising a sleeve including at least one recess for receipt of said at least one projection, said sleeve including an internal threaded portion and said end of the cylinder including an outer threaded portion, and said at least one projection on said piston rod engaging a stop defined by a shoulder on said sleeve when the piston rod is at or adjacent said innermost position.

6. In a pneumatic spring including a cylinder defining a sealed cavity therein, a piston rod received through an axial end wall of said cylinder for axial movement relative to said cylinder between axially innermost and axially outermost positions, a piston carried by the piston rod within the cavity and dividing the cavity into two compartments, and a body of gas under pressure within said cavity tending to bias the piston rod axially outward of the cavity, the improvement comprising: means carried in part by the piston rod externally of said cavity and in part by the cylinder at the end thereof through which the piston rod extends for selectively releasably retaining the piston rod at or adjacent said innermost position of the piston rod, said retaining means comprising a recess in said piston rod, a retaining member connected to said cylinder, and a removable member received in said recess and cooperating with an abutment surface on said retaining member to retain said piston rod at or adjacent said innermost position.

7. The pneumatic spring of claim 6 wherein said retaining member includes at least one recess, and said cooperating member is substantially in the form of a pin-shaped member which engages both said recess of said piston rod and said recess of said retaining member.

8. The pneumatic spring of claim 6 whereby said recess in the piston rod is in the form of an annular groove.

9. The pneumatic spring of claim 6 wherein said removable member cooperating with said retaining member and said recess comprises a securing bracket.

* * * * *